Nov. 29, 1960     A. J. VANDER WILT     2,961,838
SELF-LOCKING JOINT FOR DOCKS
Filed Jan. 17, 1958     2 Sheets-Sheet 1
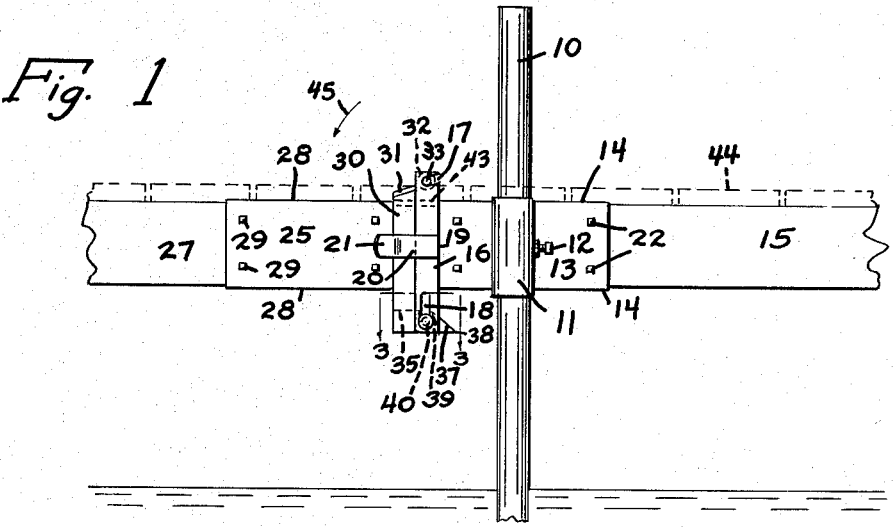
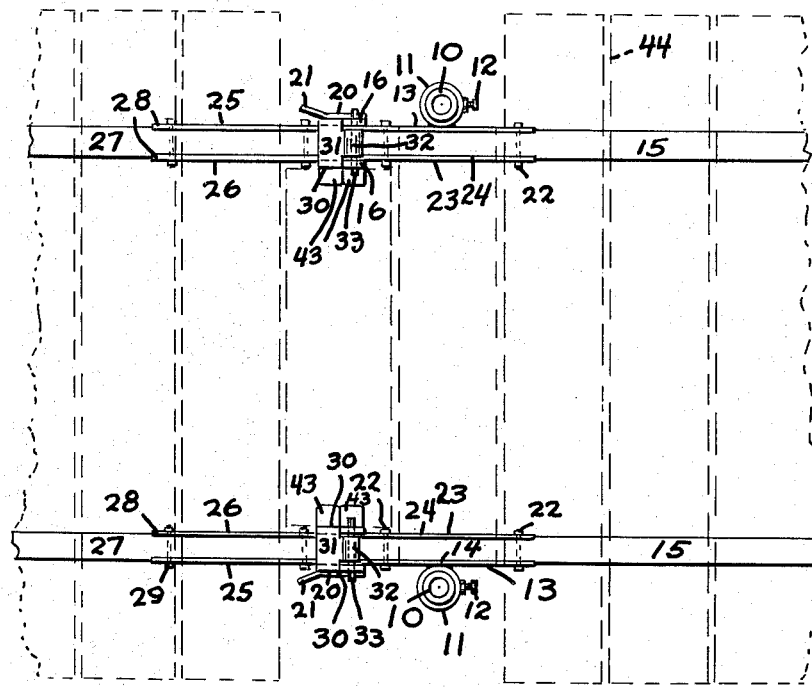
INVENTOR.
Arnold J. Vander Wilt
BY
*Sam J. Slotsky*
ATTORNEY

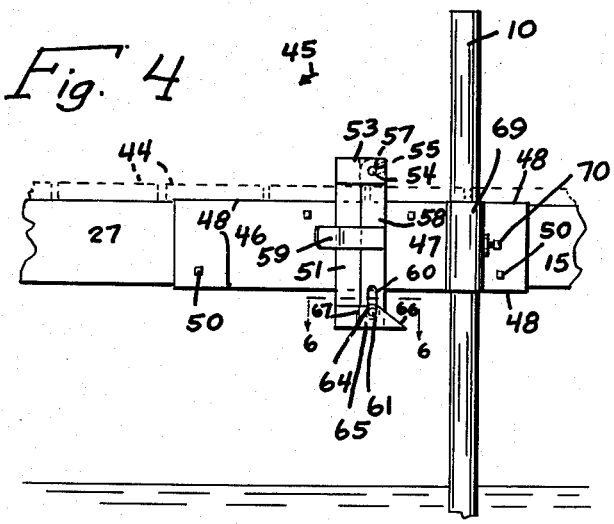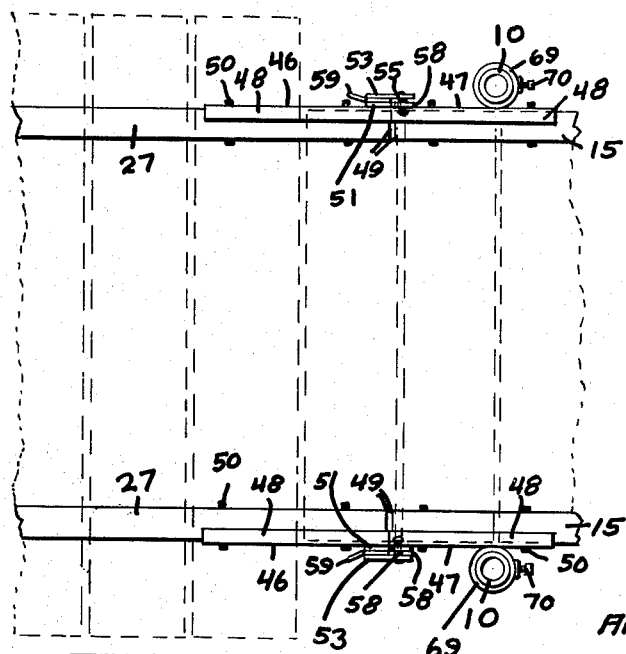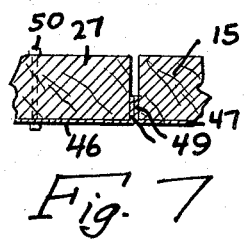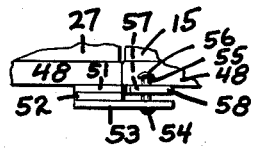

United States Patent Office 2,961,838
Patented Nov. 29, 1960

2,961,838
SELF-LOCKING JOINT FOR DOCKS
Arnold J. Vander Wilt, Hospers, Iowa Filed Jan. 17, 1958, Ser. No. 709,523

1 Claim. (Cl. 61—48)

My invention relates to a self-locking joint for docks.

An object of my invention is to provide a joint for dock sections whereby the dock sections can be conveniently and easily attached to each other, and whereby any number of these sections can be joined in a positive manner and also locked in a positive manner, and whereby the sections can be readily removed when desired.

A further object of my invention is to provide a dock-hinge structure which can be readily made.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a side elevation of a portion of the joined dock sections, showing my type of joint, Figure 2 is a plan view of Figure 1, Figure 3 is an enlarged sectional view of Figure 1 taken along the lines 3—3 of Figure 1, Figure 4 is a side elevation of a preferred modification of the device, Figure 5 is a plan view of Figure 4, Figure 6 is an enlarged sectional view taken along the lines 6—6 of Figure 4, Figure 7 is an enlarged detail, and Figure 8 is an enlarged plan view of a portion of the locking arrangement.

My invention contemplates the provision of a simple and effective joint structure to be used for joining dock sections together, which enables the dock sections to be removed readily when desired.

I have used the character 10 to designate the pipes which are driven into the bed of the lake to support the dock sections of my invention, and receiving the pipes 10 are the cylindrical members 11 having the lock screws 12 which are adapted to abut against the pipes 10, the members 11 being welded to the side plates 13 having the bent-over flanges 14, to thereby provide means for snugly receiving the standard wooden dock sections 15. Attached to the ends of the plates 13 are the vertically positioned straps 16 having the angularly inclined slots 17 therein, the straps 16 also including the vertically positioned slots 18. Attached to the outside straps 16 at 19 are the bars 20 having the outwardly bent portions 21.

The character 22 designates bolts which pass through the plates 13 and which also pass through the further plates 23 at the inner side of the structure, these plates also having the bent-over flanges 24. A further pair of plates 25 and 26 are also provided, which in turn receive the further wooden dock members 27, the plates 25 and 26 also having the bent-over flanges 28, the character 29 designating suitable bolts passing through the plates 25 and 26 for securing the members 27, it being understood also that openings are drilled through the wooden members 15 and 27 for receiving the respective bolts.

Welded to the ends of the plates 25 and 26 are the vertically positioned straps 30, at the top of which are attached the small strap sections 31 which are curled about at 32 to receive the transverse pins 33, and attached at 34 at the inside of the straps 30 are the bars 35 which extend slightly inwardly at 36 and which bars extend into the sloping portions 37 terminating at the point 38, and formed in the bars 35 are the vertically positioned slots 39.

Received within the slots 18 are the further pins or bolts 40 having the expanded heads 41 and the washers 42. Attached to the inner straps 16 and 30 are the small lips or flanges 43.

The dock sections are made up by attaching the above described joints to the wooden beams 15 and 27, and by also nailing the cross boards 44, indicated by the dotted lines, to these beams, with certain of the shorter cross boards resting upon the flanges or ledges 43, the balance of the boards extending beyond the members 15 and 27 as shown in Figure 2. It will be noted that one of the shorter boards will rest upon the ledges 43, and this shorter board can be put in place after the sections are joined. The sections having the beams 15 are attached to the posts 10 by merely placing the sockets 11 over the posts, and allowing the sectional framework to drop to the desired level, whereupon the set screws 12 are tightened.

The next section is then installed in place in the following manner. The pins 33 are placed at the open end of the slots 17, with the section being placed angularly, and the pins 33 will then drop to the position shown in Figure 1 or at the bottom of the slots 17. The section is then swung in the direction of the arrow 45, the plates 20, 21 acting as guides, and the portions 37 of the bars 35 will then pass between the lower ends of the straps 16, with the sloping surfaces 37 passing beneath the pins 40, until these pins will drop into the slots 39, thereby locking the sections together without danger of dislodgment, and the sections are thereby firmly secured together. The sections can be raised by any suitable winch structure attached to the posts 10 or any other arrangement can be used. It will be noted by virtue of this construction that any number of sections can be attached to form the desired length of the dock, and by merely raising the pins 40 and pivoting the sections 27 etc. upwardly a slight distance, the entire dock can be disassembled during any season or condition encountered.

Figures 4 to 8 inclusive illustrate a much simpler form of the arrangement, and which is a preferred form. In this form identical characters will indicate identical parts, and I have used the characters 46 and 47 to indicate plates having the bent-over flanges 48, the plates 46 and 47 also including the bent-over end flanges 49 (see Figure 7), the dock sections 15 and 27 abutting against the flanges 49 and being received between the flanges 48 to provide a stronger joint, the plates 46 and 47 including the bolts 50 passing therethrough and also passing through the dock sections 15 and 27 to rigidly support the dock sections.

Attached to the ends of the plates 46 are the vertically positioned straps 51 to which are attached at the upper ends thereof the spacers 52 to which are attached the horizontally positioned straps 53, and attached rigidly to the straps 53 at 54 are the pins 55 which are headed over at 56, the pins 55 being received within the angularly positioned slots 57 which are provided in the further vertical straps 58 which are attached at the ends of the plates 47. Attached to the straps 58 are the horizontally positioned guide straps 59, and the straps 58 also include at the bottom thereof the vertically positioned slots 60, which slots receive a further transverse pin 61, and rigidly attached to the transverse pin 61 are the spaced washers 62 (see Figure 6), the pins 61 also being received within the slots 64 which are provided in the lower horizontally positioned straps 65 which include the sloping surfaces 66, the straps 65 being bent at 67 (see Figure 6) and being attached as at 68 to the vertically positioned straps 51.

Welded to the plate 47 are the tubular sockets 69 in which are received the posts 10, the lock screws 70 serving to firmly secure the sockets to the posts. It will be noted in this construction that the shorter boards 44 (see Figure 5) can rest upon the flanges 48.

The operation for assembling the sections in this modification is substantially the same as described for Figures 1 to 3 inclusive, the type shown in Figures 4 to 8, however, being preferred in that less pieces are required and which will still provide means whereby the dock is rigid when assembled.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

A joint for connecting the abutting ends of dock sections comprising a plate attached to one end of a first of said sections, a vertically positioned strap attached at one end of said plate, said strap having an upper slot inclined downwardly at an angle to said strap on the side thereof nearest the other of said sections, and having a lower vertically positioned slot therein, a further plate attached to the abutting end of the other of said dock sections, a further vertically positioned strap attached to the end of said further plate, a bar attached to the upper end of said further strap and extending outwardly thereof towards said first section, a transversely positioned pin attached to the outer end of said bar, means for locking said straps together when said straps are in abutment, including a further pair of lower horizontally positioned bars positioned at right angles to said further strap and being parallel to the longitudinal axis of said dock sections attached to the lower end of said further strap, said lower bars including further slots normally in alignment with said lower vertically positioned slots when in locking position, said lower bars having sloping end surfaces, a further transverse loose pin received in said further slots and said vertical slots adapted to bear against said sloping end surfaces during locking action.

References Cited in the file of this patent
UNITED STATES PATENTS 2,618,124    Holsten _____ Nov. 18, 1952